Patented Aug. 28, 1934

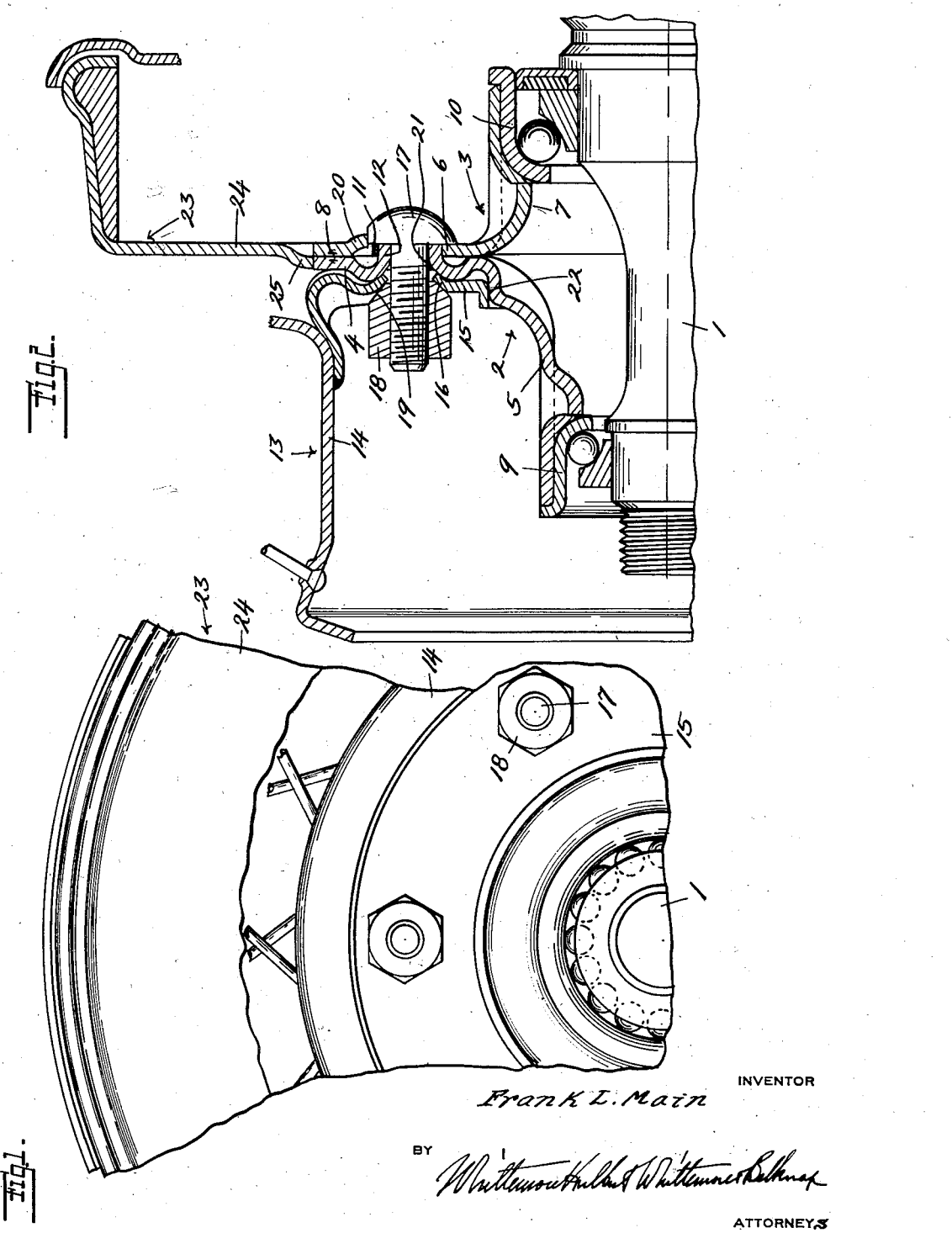

1,971,864

UNITED STATES PATENT OFFICE 1,971,864

WHEEL

Frank L. Main, Birmingham, Mich., assignor to Kelsey-Hayes Wheel Corporation, Detroit, Mich., a corporation of New York Application January 25, 1932, Serial No. 588,760

2 Claims. (Cl. 301—9)

The invention relates to wheels and refers more particularly to wheels for use with motor vehicles. One of the objects of the invention is to provide an improved hub construction of wheel which is of relatively light weight and yet sufficiently strong and rigid to withstand the stresses to which it is subjected. Other objects are to so construct the parts that they are positively driven together independently of the securing means and also that the wheel body is positively driven therewith independently of the securing means.

These and other objects of the invention will become apparent from the following description, taken in connection with the accompanying drawing, in which Figure 1 is a front elevation of a wheel, showing an embodiment of my invention;

Figure 2 shows a radial section of the wheel shown in Figure 1.

As shown in the present instance, the wheel construction embodying my invention is the front wheel of a motor vehicle which is adapted to be revolubly mounted upon the steering spindle 1. The hub of the wheel construction comprises the cooperating front and rear members 2 and 3, respectively, each of which is preferably formed of sheet metal and stamped to shape. The front hub member has the radially extending annular flange 4 and the forwardly extending integral barrel 5, the axis of which is at right angles to the flange. The rear member comprises the radially extending annular flange 6 and the integral rearwardly extending barrel 7, the axis of which is at right angles to the flange and coincides with the axis of the barrel 5. The flanges 4 and 6 are secured together in abutting relation as by being welded at 8. In order to permit the use of lighter gauge steel in the members 2 and 3, the outer anti-friction bearing races or cups 9 and 10 are fixedly secured in the barrels 5 and 6 as by welding and these races are formed of a special alloy, so that they serve to sufficiently reinforce the barrels.

The members 2 and 3 are provided with cooperating inter-engaging driving portions and, as shown, the flange 6 is provided with the annular series of transverse recesses or openings 11 and the flange 4 is provided with a like number of correspondingly positioned tubular projections 12 which extend rearwardly and are adapted to fit in the recesses or openings and which cooperate therewith to properly position the hub members with respect to each other and also drive these hub members together. The driving portions of one of the hub members also serves in driving the wheel body 13 which, as shown, is demountable and has the outer hub or hub shell 14, which is provided with an internal mounting portion 15 having the rearwardly extending tubular driving projections 16. In detail, the driving projections 12 in the flange 4 are flared at their front ends to provide recesses within which fit the driving projections 16, these latter being tapered. For detachably securing the wheel body to the flanges, I have provided the bolts 17 and the nuts 18, the bolts extending through the driving projections and recesses and the nuts having tapered noses 19 for fitting the driving projections 16. The bolts are held from rotation by suitable means, such as the tongues 20 formed by depressions in the flange 6 and more particularly sheared out from this flange, these tongues having their edges abutting flats upon the heads of the bolts and these bolts are also preferably held from accidental disengagement by means of the fins 21 sheared from the bolt shanks and adapted to contact with the flared portions of the driving projections 12.

For guiding the wheel body while it is being mounted, the front member 2 is provided with the peripherally spaced external shoulders 22 near its flange 4, these shoulders being freely engageable with the foot flange at the inner periphery of the mounting member 15.

In the present instance, the rear member 3 is an integral part of the brake drum 23 and the flange 6 is continued beyond the flange 4 to form the back or web 24 of the brake drum. If desired, this back may be provided with the forwardly extending tongues 25 sheared therefrom and engageable with the outer periphery of the flange 4 to assist in centering the front and rear members.

What I claim as my invention is:

1. In a wheel, a hub member having a barrel and an integral transverse flange, said flange being provided with an annular series of recesses, a second hub member having a barrel and an integral transverse flange secured to said first mentioned flange, said last mentioned flange being provided with an annular series of tubular driving projections with each projection having a portion extending into a recess and a portion laterally spaced from said first mentioned flange and flared to receive a tubular driving projection upon a wheel body, and means extending through said recesses and said first mentioned driving projections and also adapted to extend through the driving projections of the wheel body for securing the latter to said hub members.

2. In a wheel, a rear hub member having a barrel and an integral radially extending flange, said flange being provided with an annular series of axial openings, a front hub member having a barrel and an integral radially extending flange abutting and secured to said rear flange, said front flange being provided with an annular series of axial tubular driving projections with each projection having a rear portion extending into an opening and a front portion axially spaced from said rear flange and flared to receive a tubular driving projection upon a wheel body, and means extending through said openings and first mentioned driving projections and also adapted to extend through the driving projections of the wheel body for detachably securing the latter to said hub members.

FRANK L. MAIN.